United States Patent [19]

Heide et al.

[11] Patent Number: 5,531,954
[45] Date of Patent: Jul. 2, 1996

[54] METHOD FOR FABRICATING A HEARING AID HOUSING

[75] Inventors: Jorgen Heide, El Granada; Ole R. Olsen, Pleasanton, both of Calif.

[73] Assignee: ReSound Corporation, Redwood City, Calif.

[21] Appl. No.: 286,522

[22] Filed: Aug. 5, 1994

[51] Int. Cl.⁶ .................................................. B29D 22/00
[52] U.S. Cl. .......................... 264/496; 264/222; 264/265; 264/278; 264/DIG. 30
[58] Field of Search ...................... 264/278, 275, 264/265, 22, 250, 222, DIG. 30, 496

[56] References Cited

U.S. PATENT DOCUMENTS 3,345,737  10/1967  Gordon ..................................... 264/222
3,475,528  10/1969  Parks et al. ............................... 264/222
4,569,812   2/1986  Werwath et al. ......................... 264/222
4,753,412   6/1988  Johnson .................................... 264/278
4,828,777   5/1989  Birkholz ................................... 264/275
5,146,051   9/1992  Hermann ................................... 264/222

*Primary Examiner*—Robert Davis
*Attorney, Agent, or Firm*—Burns, Doane, Swecker & Mathis

[57] ABSTRACT

A method for fabricating an individually adapted in-the-ear hearing aid shell with a battery compartment cast into the shell such that the door of the battery compartment is flush or slightly recessed in the portion of the shell that contacts the user's ear cavity.

11 Claims, 7 Drawing Sheets

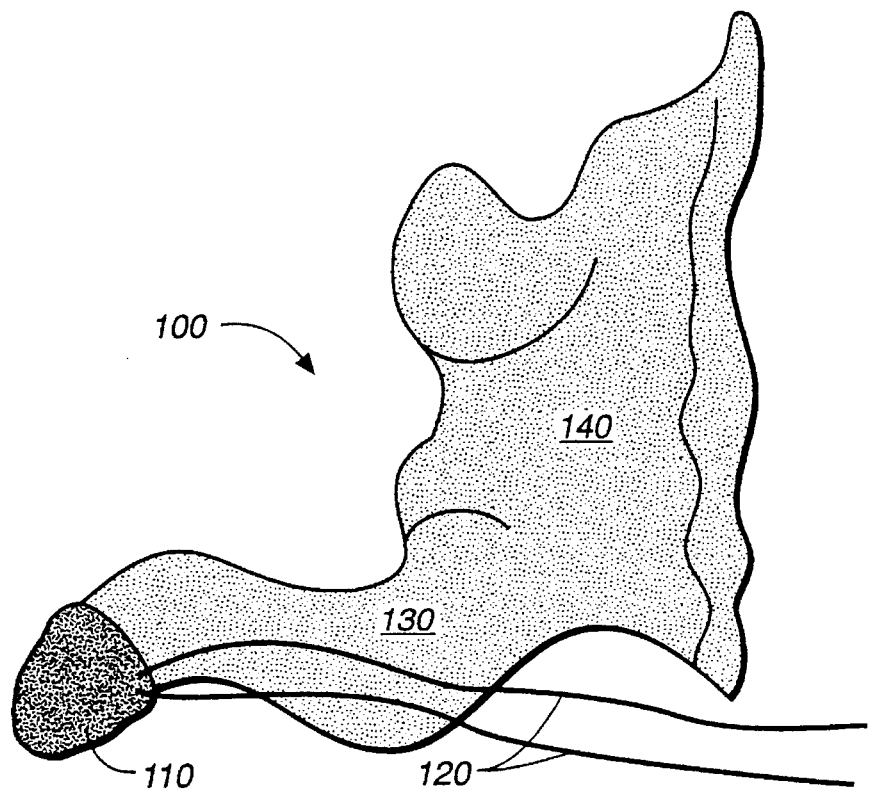
FIG._1
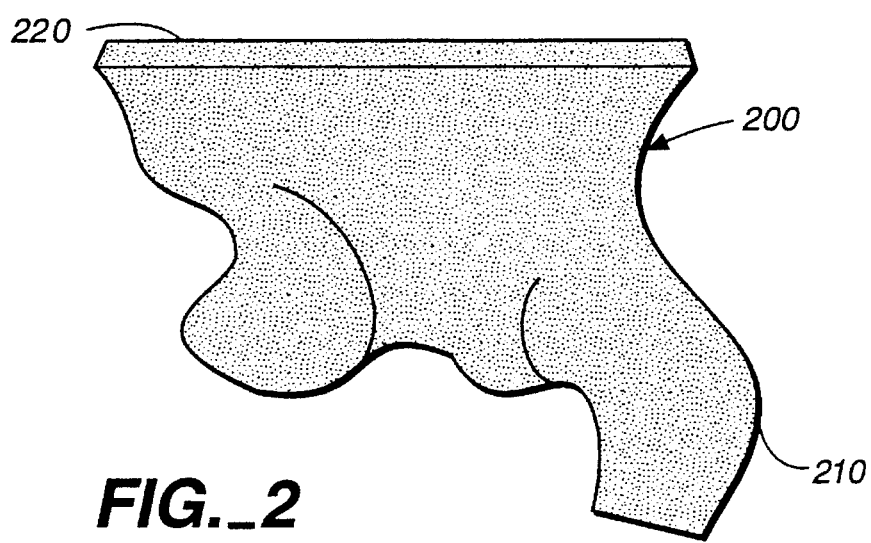
FIG._2

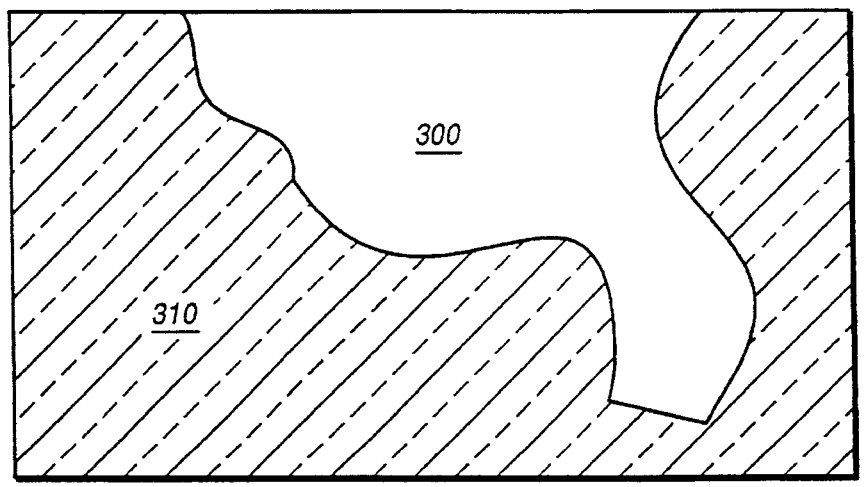
FIG._3
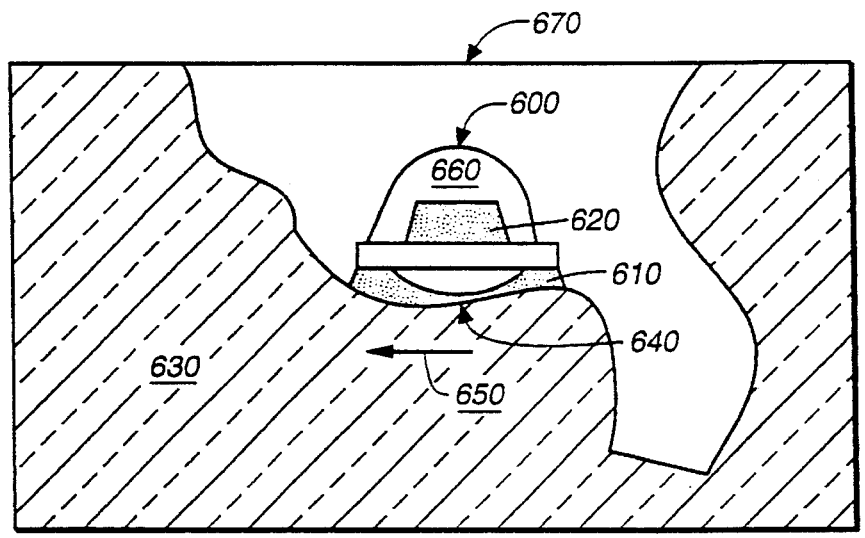
FIG._6
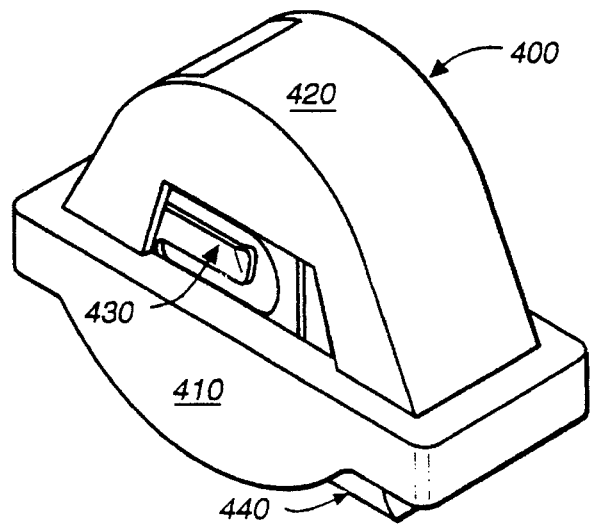
FIG._4

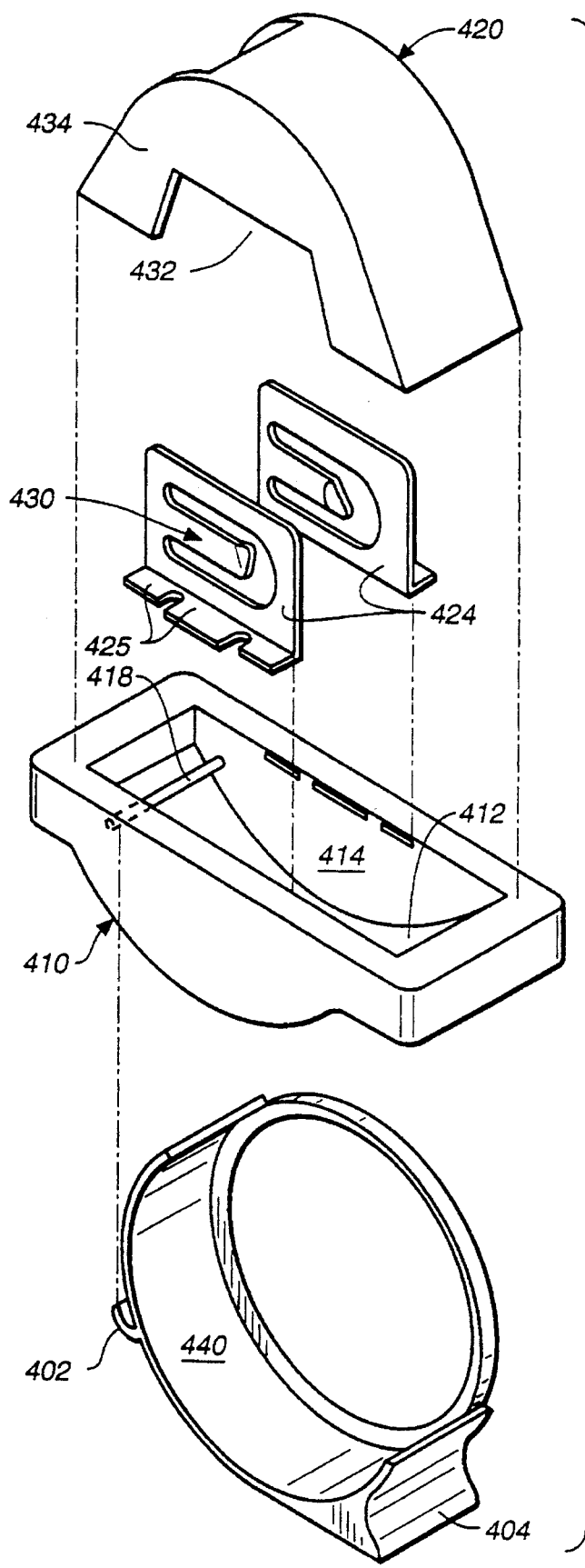
FIG._5

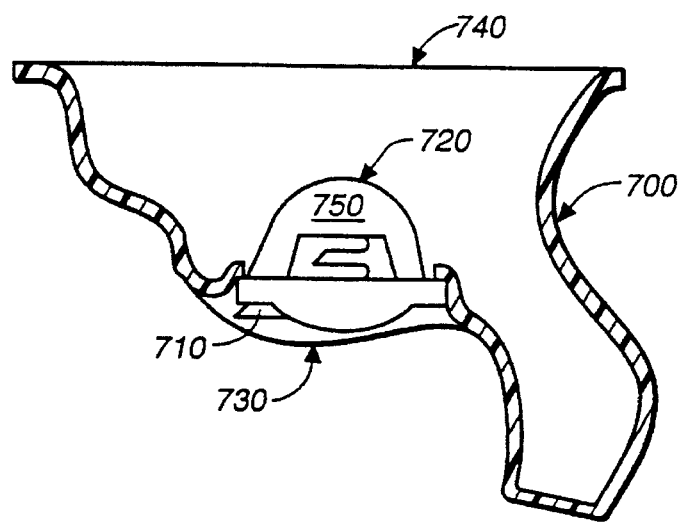
*FIG._7*
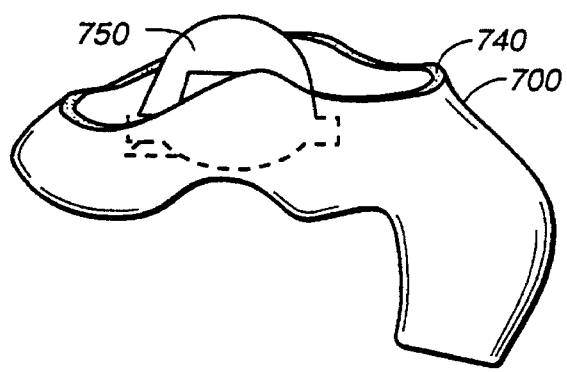
*FIG._8*
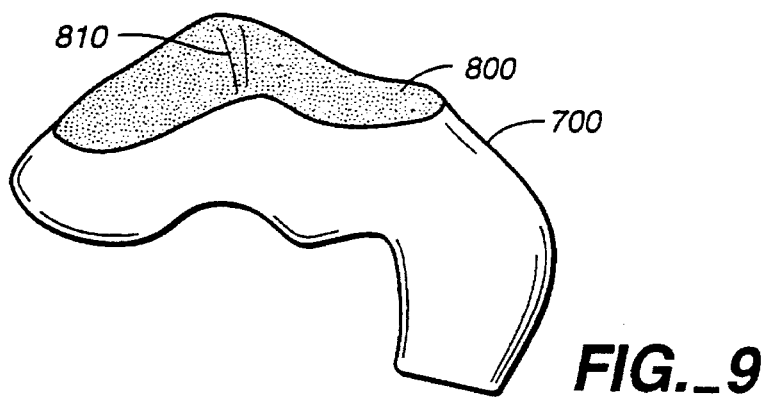
*FIG._9*

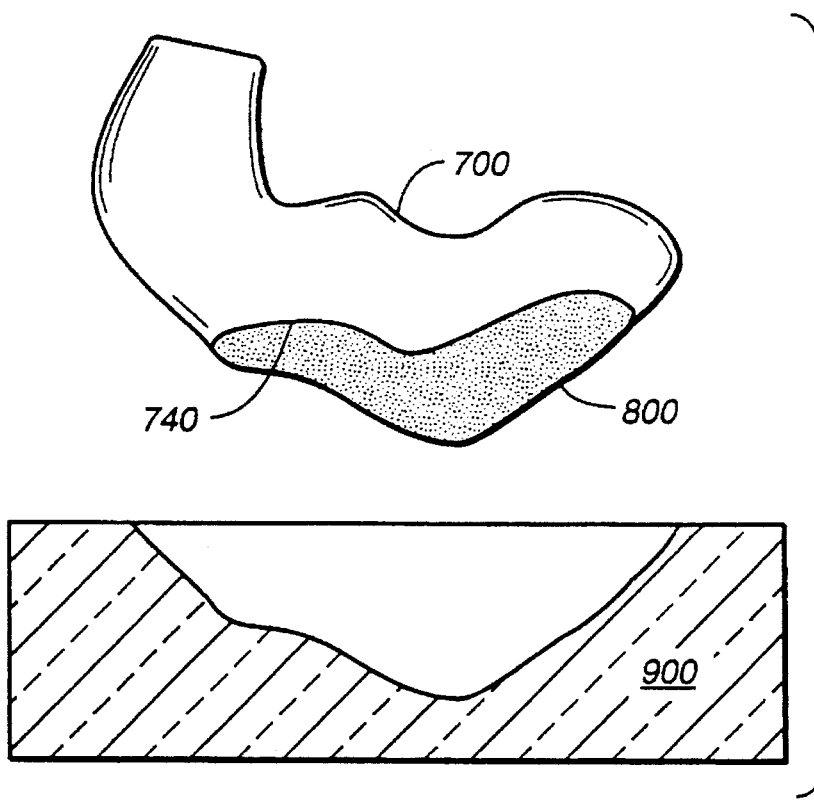
FIG._10
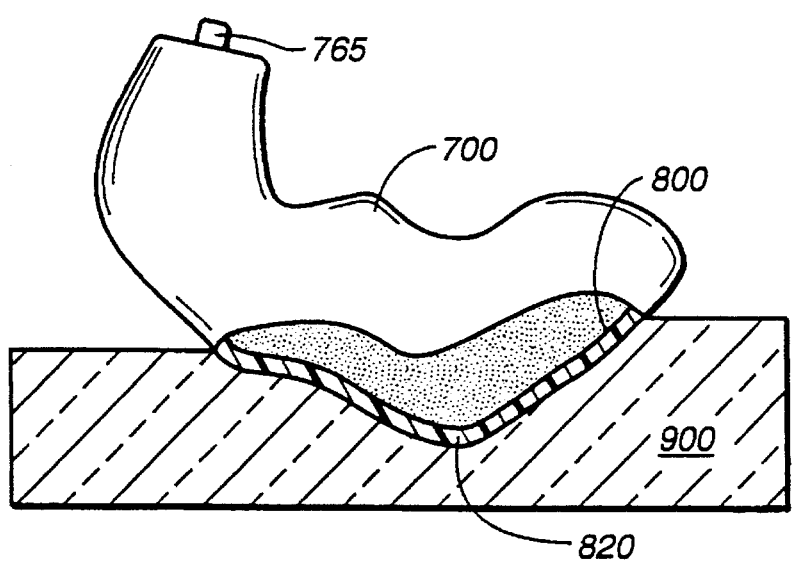
FIG._11

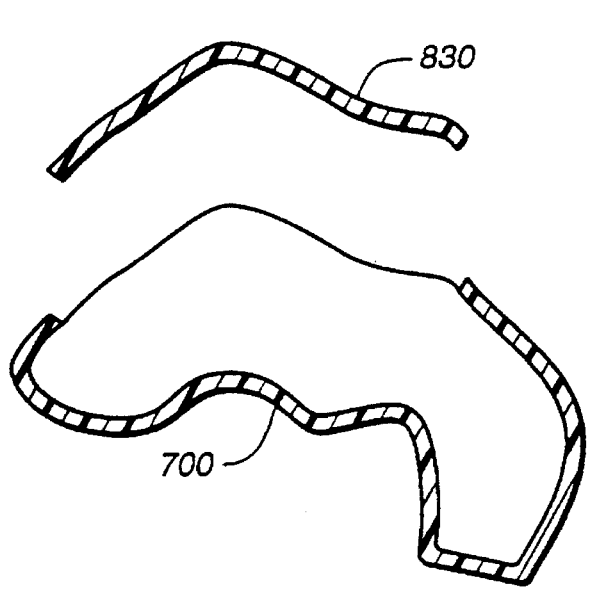
FIG._12
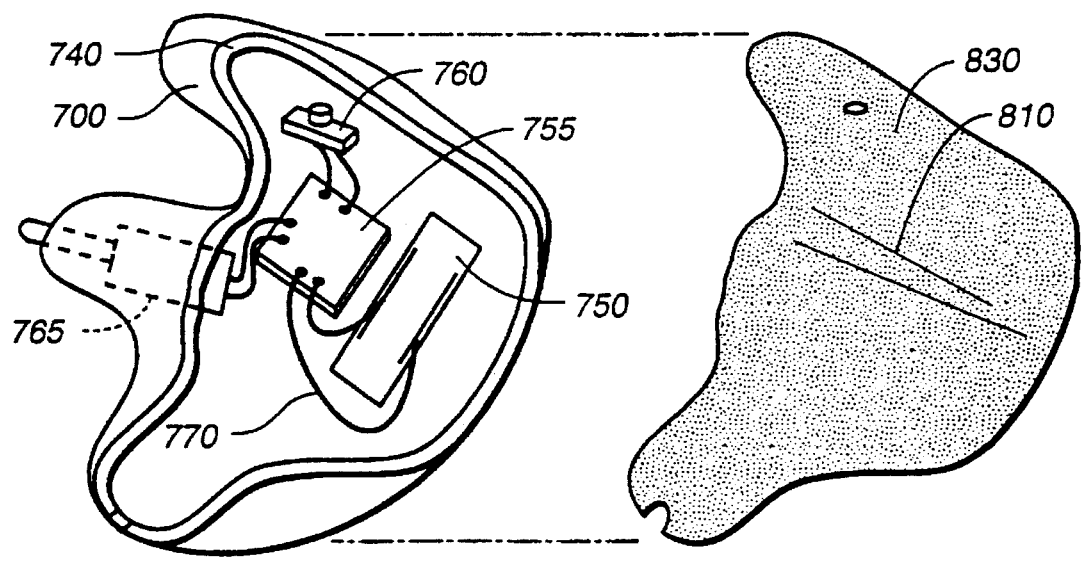
FIG._13

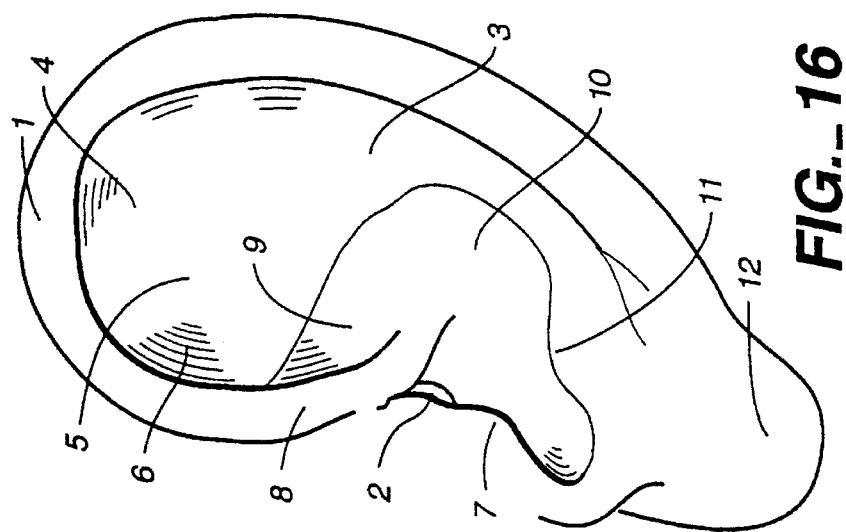
FIG._16
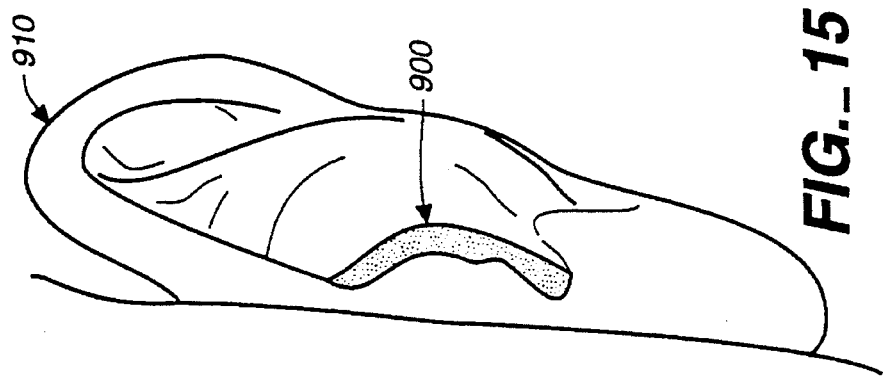
FIG._15
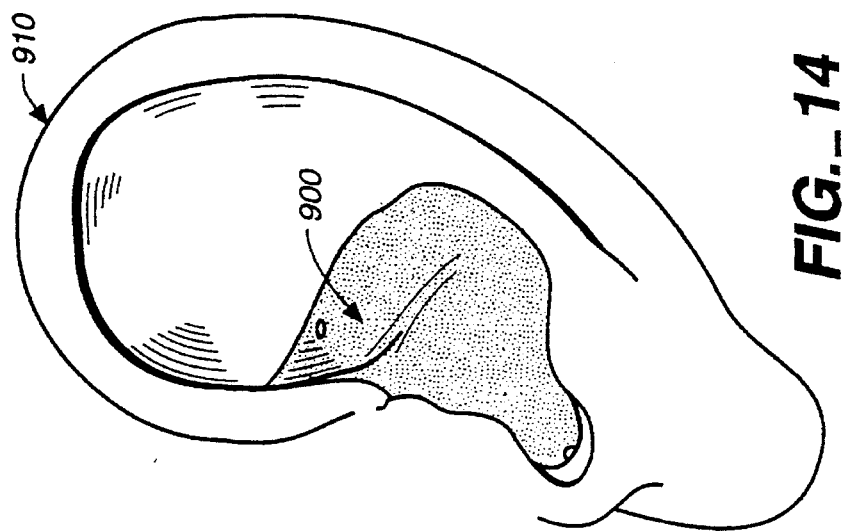
FIG._14

METHOD FOR FABRICATING A HEARING AID HOUSING

FIELD OF THE INVENTION

The invention relates generally to the fabrication of radiation-reactive fusible materials, and more particularly to a method for fabricating an individually adapted in-the-ear hearing aid housing comprised of radiation-reactive materials.

BACKGROUND OF THE INVENTION

In-the-ear hearing aids, aids housed entirely within the ear cavity, are popular because they are relatively inconspicuous. To further conceal the aid, the color of the aid housing or shell and the design of its faceplate are made to most closely match that of the hearing aid user's ear. Many current hearing aid shells are made of monomer or polymer mixtures which are colorizable and can be hand-carved so that the faceplate can be custom made to most closely match the individual user's ear cavity. However, these prior art hearing aid shells are costly to manufacture and are not capable of mass production for a couple of reasons. First, unlike other fusible materials, monomer and polymer can usually only be hand-caste. Secondly, hand-carving of the faceplate is very time consuming.

There are other prior art methods of shell fabrication that employ radiation-reactive materials and automated ultraviolet curing techniques and apparatuses which can mass produce shells at a lower cost. These methods are especially successful in the fabrication of thin-walled shells for various applications and for in-the-ear hearing aids. The invention disclosed in PCT Application No. DK91/00257 having Publication No. WO 9204171 (the "Olsen application") provides one particular method and apparatus for producing such thin-walled, individually-adapted hollow housings or shells for in-the-ear hearing aids. While the method and apparatus of the '257 invention is advantageous in the curing of shells, it does not provide a method for specifically customizing the faceplate of the shells. It is therefore desirable to provide a method of fabricating such faceplates in conjunction with the general method described in the above application; accordingly, that application is hereby incorporated by reference.

The majority of conventional in-the-ear hearing aid shells are designed such that the battery is housed just under the faceplate and the battery door is located on the outer surface of the faceplate. Although this design is the easiest to manufacture and facilitates access to the battery, it makes the faceplate less natural looking. Thus, it is desirable to provide a method of fabricating a hearing aid shell with access to the battery compartment at a location that does not require access through the faceplate yet one that does not increase the expense of manufacturing.

Accordingly, it is an object of the present invention to provide a method of fabricating an in-the-ear hearing aid shell having a faceplate that is less conspicuous than the prior art.

It is another object of the present invention to provide a method of fabricating an in-the-ear hearing aid shell that is less expensive than the prior art.

Another object of the present invention is to provide a method of fabricating an in-the-ear hearing aid shell having a battery compartment and access thereto that is less conspicuous than the prior art but one that does not increase manufacturing costs.

BRIEF DESCRIPTION OF THE DRAWINGS

FIG. 1 is side elevation view of an impression of a typical hearing aid user's ear canal and cavity.

FIG. 2 is a side elevation view of the impression of FIG. 1 after being trimmed.

FIG. 3 is schematic sectional view of a positive mold of the trimmed impression of FIG. 2.

FIG. 4 is a perspective view of the battery compartment subassembly of a hearing aid.

FIG. 5 is an exploded perspective view of the battery compartment subassembly illustrated in FIG. 4.

FIG. 6 is a schematic sectional view of the battery compartment subassembly of FIGS. 4 and 5 positioned within the positive mold of FIG. 2.

FIG. 7 is a schematic sectional view of the hearing aid shell produced by a the method of the present invention.

FIG. 8 is a perspective view of the battery compartment subassembly and hearing aid shell of FIG. 7 after the shell height has been reduced.

FIG. 9 is a perspective view of the battery subassembly and shell of FIG. 8 wherein the shell is filled with putty material.

FIG. 10 is shows a perspective view of the shell of FIG. 9 and a sectional view of a mold of its impression.

FIG. 11 is a sectional view of the shell and mold of FIG. 10 separated by ultra violet radiation material.

FIG. 12 is a schematic view of the shell and faceplate after the UV radiation process.

FIG. 13 is an exploded top view of the shell and faceplate of FIG. 12.

FIG. 14 is a side elevation view of the hearing aid housing worn in a left ear.

FIG. 15 is a front elevation view of the hearing aid housing worn in a left ear.

FIG. 16 is a side elevation view of a left ear.

SUMMARY OF THE INVENTION

The present invention provides a novel method for fabrication of a hearing aid housing which overcomes the drawbacks of prior art designs and achieves the aforesaid advantages.

Very generally, the method of the present invention is for fabricating a shell made of radiation-reactive material and having an inner compartment. The method comprises the steps of providing a hollow positive mold of the cavity for which the shell is being made, the mold being made of molding material and having an opening for providing access thereto, placing the compartment within the positive mold, the compartment having a door wherein the door is positioned such that the door is sufficiently flush with the outer surface of the positive mold, and casting a mold of the inner surface of the resulting structure, the mold being made of radiation-reactive material.

Application of the method of the present invention achieves the dual objectives of providing an in-the-ear hearing aid shell that is less conspicuous and less costly to manufacture than prior art shells. Ideally, the shell has a faceplate that is customized to match the color, contours and shape of the hearing aid user's ear cavity. To this end, the battery compartment and access thereto are preferably located at the backside of the shell. Locating the battery compartment and door at the backside of the shell will provide a faceplate that has a continuous surface for facilitating customized contouring and coloring. Since the battery door is located at the backside of the shell and in physical contact with the user's ear cavity, the door must also be contoured and flush so as to fit comfortably within the ear. The fabrication methods of the present invention provide an in-the-ear hearing aid shell having the above-described characteristics.

DETAILED DESCRIPTION OF THE DRAWINGS

Referring now to the drawings, with like numbers referring to like components, and to FIG. 1 in particular, there is shown a negative impression 100 of the cavity and canal of a left ear. For purposes of this discussion, illustrations of the ear, hearing aid shells and faceplates are of and for the left ear. Impression 100 is formed by an injection procedure commonly known by those skilled in the art of fabricating hearing aid shells. Here, silicon, or another suitable material having similar properties, is injected into the user's ear canal, filling the canal and ear cavity to the outer ear. Prior to the injection procedure, a plug 110 of absorbent material having a string 120 attached thereto is placed in the user's ear canal, just past the second bend. Plug 110 prevents the silicon from traveling too far into the ear canal. String 120 allows the impression 100 to be pulled out of the ear once it has sufficiently dried. Sections 130 and 140 of impression 100 are the impressions of the ear canal and ear cavity, respectively.

From this negative impression, positive molds of the ear canal and cavity are made by techniques commonly used in the art. First, a mold (not shown), preferably made of silicon, is made for the purpose of checking the fit of the finished shell and faceplate. Next, as shown in FIG. 2, the negative impression 100 is trimmed to eliminated portions of the impression that are not necessary for forming the shell and faceplate. Specifically, the tip of the canal portion 210 and a portion of the side 220 of the cavity portion is removed. From this trimmed impression, a positive mold 300, shown cross-sectionally in FIG. 3, is formed in molding material 310. The molding material must be transparent so as to allow for the radiation to be performed later in the fabrication process. Colloid is ideally suited for this purpose and is also less expensive than silicon as it can be melted and reused for future molds.

Referring now to FIG. 4, there is illustrated a perspective view of an exemplary battery compartment subassembly 400 used to demonstrate the method of the present invention. Subassembly 400 comprises battery boot 420, battery faceplate 410, positive and negative electrical contacts 430 (only one is visible), and battery door 440. It is within the scope of the present invention to employ varying shapes and sizes of batteries to implement the disclosed method. For implementation of the preferred embodiment of the present invention, it is necessary to use a boot made of nylon or tinaet or other materials that will not react with or stick to ultra violet radiation reactive material when cured.

FIG. 5 shows an exploded view of the battery compartment of FIG. 4. A small disk-shaped battery (not shown) commonly used to power hearing aids is cradled within cylindrical battery door 440. The battery and door 440 can be positioned into opening 412 of boot 420 such that the electrical positive and negative sides of the battery touch conductive contacts 422 and 424. These contacts fit securely within the inner sides 414 (only one of which is visible) by means of prongs 425 on contacts 422 and 424 and corresponding slits 416 of inner sides 414. A hinge 418 is positioned perpendicularly to and between inner sides 414 and toward one end of boot 420. Hinge 418 interlocks with clip 402 on door 440 such that when they are coupled door 440 can be rotated downward and away from boot 420. The half cylinder-shaped cover or faceplate 410 having window 432 on each of its sides 424 can then positioned over the battery. Windows 432 allow contacts 422 and 424 to be electrically coupled to the electronic components (not pictured) of the hearing aid.

After forming the colloid mold of the trimmed impression, the next step is to cast the hearing aid shell made of ultra violet (UV) radiation-reactive material (CAS 56744-60-6). Prior to positioning the battery compartment subassembly within the mold, preliminary preparations are necessary to ensure that the battery contacts are protected from coming into contact with the UV material. These preliminary preparations are illustrated in FIG. 6. The battery door (not visible) and conductive contacts (not visible) of the assembled battery compartment subassembly 600 (without an enclosed battery) in its closed position are covered with a small amount colloid material at reference numerals 610 and 620. Colloid material 620 protects the battery contacts from coming into contact with the UV material so as to maintain its conductive properties. The battery compartment subassembly 600 is then placed within the positive mold with the battery door and the overlying colloid material 610 facing downward and sitting on bowl (i.e., the portion of the impression made along the user's cavum conchae; see FIG. 16) 640 of positive mold 630. Door catch (not shown in FIG. 6 but illustrated at 402 in FIG. 5), points in the direction of arrow 650, i.e., perpendicular to the radix helicis 8 and parallel to the helix 1 if placed into the ear illustrated in FIG. 16.

Departing a moment from the description of the method of the present invention and referring now to FIG. 16, there is illustrated a left ear having helix 1, meatus acusticus externus 2, anthelix 3, crus superius anthelicis 4, crus inferius anthelicis 5, fossa trianguairis 6, tragus 7, radix helicis 8, cimba conchae 9, cavum conchae 10, antitragus 11, and lobe 12.

Returning now to the description of the method and to FIG. 6, battery subassembly 600 should be pressed downward until the colloid material 610 hardens. The subassembly 600 is then removed from positive mold 630. A cutting instrument, ideally a razor blade, can be employed to cut away the unnecessary colloid material which surrounds the perimeter of the battery door. The purpose of colloid material 610 over the battery door is to ensure that the door is slightly receded from and flush with the outer surface of the resulting shell after the radiation process. Next, the battery subassembly 600 is placed in the same position within the mold 630. The liquid UV material is then poured into positive mold 630 up to surface 660.

The UV material is then cured according to the method disclosed in the Olsen application. This method produces a thin-wallhearing aid shell 700 of UV material, illustrated in FIG. 7. Battery door 710 of subassembly 720 can now be opened from the outside of shell 700. However, a cross-sectional side view indicates that door 710 does not protrude from and is flush with surface 730 of shell 700 such that shell 700 fits comfortably within the ear cavity against a user's radix helicis (see FIG. 15 for anatomy of the human ear) within the ear cavity. The cross-sectional side view also shows that the flange around the battery faceplate 410 is cast into the hearing aid shell such that a portion of the shell 700 conforms to the flange around the battery faceplate to provide secure support of the subassembly 720.

At this point in the process, the top perimeter 740 of shell 700 is leveled or cut to reduce the height of the shell such that the crests of perimeter 740 match those of the individual user's tragus and antitragus. The proper height may be determined by inserting shell 700 into the positive silicon mold initially formed prior to trimming of the negative impression.

FIG. 8 illustrates a perspective view of the shell 700 after the perimeter 740 has been reduced to the proper height. At all points on the perimeter, the height of shell 700 is no lower than the highest point of battery boot 750. Ventilation holes can now be made in the shell by techniques commonly known in the art. Next, dummy cores (not illustrated) of the same size and dimensions of the electronic components, e.g., amplifier, microphone, etc., are then temporarily glued in their appropriate locations within the hearing aid shell.

Referring now to FIG. 9, shell 700 is filled with a putty material or molding clay 800 so as to completely cover the shell's opening. The putty or clay is preferably of a salt and flour base. A ridge 810 replicating the user's radix helicis is then built up or molded on the surface of putty material 800. Preferably and ideally, the perimeter and contours of the putty material are a mirror image of the user's ear cavity. Next, as illustrated in FIG. 10, a positive impression 900 is made of the putty surface 800 in colloid material. Typically, approximately 35 minutes is required for the mold or cast to set. After removing shell 700 from the colloid mold 900, putty piece 800 is pressed into the shell's opening so as to recede slightly below the perimeter's edge 740. The cavity of the colloid form is then conformally coated with UV material 820 having a color that is properly matched to the color of the user's ear. To most closely match the appearance of the user's ear, colored fibers (i.e., red fibers for user's having fairer skin) are added to the UV material. A lubricant is then brushed along the perimeter's edge 740 of shell 700 to prevent it from sticking to the UV material.

As illustrated in FIG. 11, shell 700 is then placed into the colloid form with the UV color material 800. The UV color material 800 is then cured according to the method disclosed in the Olsen application, forming a faceplate 830, illustrated in FIG. 12, which fits into the opening of shell 700. Putty 800 and the dummy cores are removed from shell 700 which is then cleaned of any residue and dirt. Faceplated 830 is then sanded and finished. The electronic components (not the dummy cores), including a battery subassembly 750 with an enclosed battery, an amplifier 755, a microphone 760, a receiver 765, and the accompanying electrical connections 770 are positioned within shell 700 as shown in FIG. 13. Finally, the hearing aid housing is finished by steps commonly known in the art. The completed housing 900 fits comfortably within the user's ear 910 and is individually adapted to closely match the color and contours of the user's ear (See FIGS. 14 and 15).

It will be understood that the foregoing is only illustrative of the principles of the present invention, and that various modifications can be made by those skilled in the art without departing from the scope and spirit of the invention.

We claim:

1. A method for fabricating a shell made of radiation-reactive material and having an inner compartment therein, comprising the steps of:

providing a hollow positive mold of the cavity for which the shell is being made, said mold being made of molding material and having an opening for providing access thereto;

placing the inner compartment within said positive mold, said inner compartment having a door wherein said door is positioned such that said door is sufficiently flush with an inner surface of said positive mold; and casting the shell in the hollow positive mold, said shell being made of radiation-reactive material.

2. The method of claim 1 wherein the step of placing said inner compartment in said hollow positive mold comprises the step of covering said door with a sufficient amount of said molding material such that said door conformally fits against said inner surface of said positive mold.

3. The method of claim 2 wherein said molding material is colloid.

4. The method of claim 1 wherein the step of casting said shell comprises the steps of:

filling said positive mold with radiation-reactive material; and curing said radiation-reactive material by means of a radiation process.

5. A method for fabricating an individually-adapted in-the-ear hearing aid shell made of radiation-reactive material and having a battery compartment therein, comprising the steps of:

providing a hollow positive mold of an ear canal and cavity of a hearing aid user, said positive mold being made of molding material and having an opening for providing access thereto;

placing the battery compartment within said positive mold, said battery compartment having a door wherein said door is positioned such that said door is sufficiently flush with an inner surface of said positive mold; and casting the individually-adapted in-the-ear hearing aid shell in the hollow positive mold, said individually-adapted in-the-ear hearing aid shell being made of radiation-reactive material.

6. The method of claim 5 wherein the step of placing said battery compartment in said hollow positive mold comprises the step of covering said door with a sufficient amount of molding material such that said door conformally fits against said inner surface of said hollow positive mold.

7. The method of claim 6 wherein said molding material is colloid.

8. The method of claim 5 wherein the step of casting said individually-adapted in-the-ear hearing aid shell comprises the step of:

filling said hollow positive mold with radiation-reactive material; and curing said radiation-reactive material by means of an ultra-violet radiation process.

9. A method for forming an individualized faceplate for use with an in-the-ear hearing aid shell which individualized faceplate matches the physical characteristics of a hearing aid user's ear, comprising the steps of:

filling the in-the-ear hearing aid shell with clay;

shaping said clay such that a surface of said clay has contours that optimally match that of an ear cavity of the hearing aid user;

forming an impression of said surface in molding material;

coating said impression with a radiation-reactive coloring material such that the color of said coloring material optimally matches a skin color of the user; and curing said radiation-reactive coloring material by means of an ultra-violet radiation process to form the individualized faceplate.

10. The method of claim 9 wherein said step of shaping said clay comprises forming a replica of the user's radix helicis on said surface.

11. The method of claim 9 wherein said molding material is colloid.

* * * * *